Jan. 8, 1929.  1,698,285
G. F. WALTER
METHOD AND APPARATUS FOR FORMING TEARING STRIP CANS
Filed Nov. 1, 1926   2 Sheets-Sheet 1
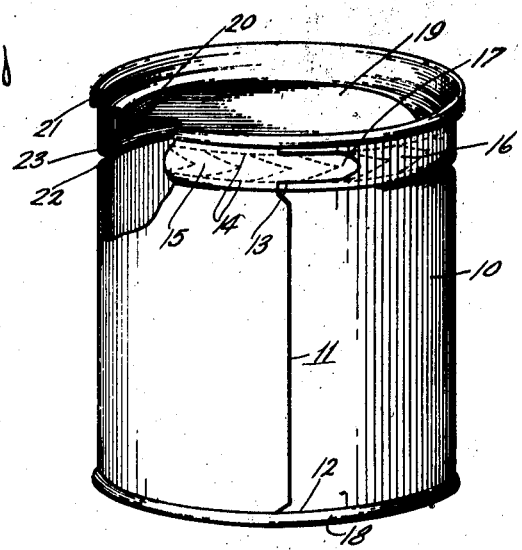
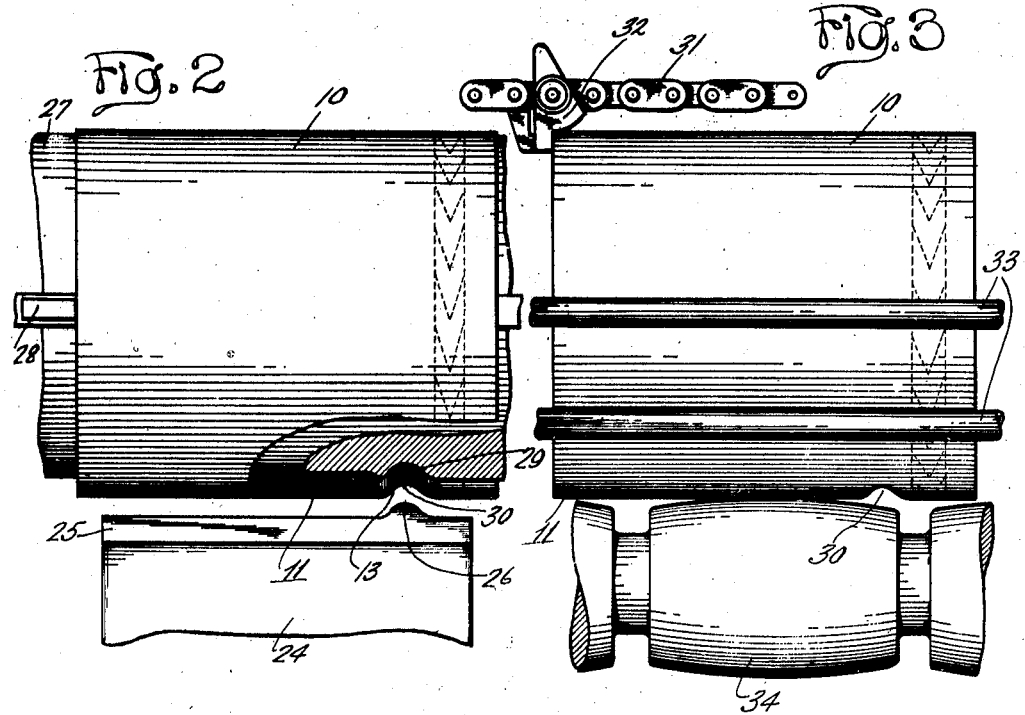
INVENTOR
George Fredrick Walter
BY Munday, Clarke
 & Carpenter
ATTORNEYS Jan. 8, 1929.  
G. F. WALTER  
1,698,285  
METHOD AND APPARATUS FOR FORMING TEARING STRIP CANS  
Filed Nov. 1, 1926     2 Sheets-Sheet 2

INVENTOR  
George Fredrick Walter  
BY Munday, Clarke  
& Carpenter  
ATTORNEYS

Patented Jan. 8, 1929.

1,698,285

UNITED STATES PATENT OFFICE.

GEORGE FREDRICK WALTER, OF BROOKLYN, NEW YORK, ASSIGNOR TO AMERICAN CAN COMPANY, OF NEW YORK, N. Y., A CORPORATION OF NEW JERSEY.

METHOD AND APPARATUS FOR FORMING TEARING-STRIP CANS.

Application filed November 1, 1926. Serial No. 145,416.

This invention relates in general to a method and apparatus for forming interiorly beaded cans and has for an object the provision of a method and apparatus for forming such cans that will be reliable, that will form substantially perfect cans or cans that do not have leaks at the seam such as may be caused by displacement of the overlapped parts. Any one skilled in the can making art knows that it is not practical to form a bead in a can until the can is fully formed, side seamed and soldered, and that when a can is fully beaded after forming or bending the metal to form, the seam is materially stretched and compressed particularly at the seam and that for this reason in cans so formed and where the bead requires extensive forming the soldered joint is frequently broken which permits the can to leak, or destroys the can.

An important object of the present invention is to eliminate this difficulty, by providing an important and preliminary operation that will form a portion of the bead or partly form the bead before the seam is soldered so that the displacement of the metal at the crossing of the seam and bead will not be sufficient to cause the soldered joint to break and a method of applying such an operation simultaneously with the bumping or seam-locking operation so that no additional operations will be required. To accomplish this the can body is formed by bending or rolling a notched can body blank to true cylindrical or other shape upon the mandrel of the body maker hooking two edges of the blank together in the usual manner to form the lock and lap seam, and bumping the seam along the length thereof to secure the lock seam, with a hammer or bumper adapted to form a recess or indentation preferably in and across the lap seam at the point which is to be the intersection of the seam and bead at the point where the desired bead will cross the seam, to partly form a portion of the desired bead or the portion thereof that crosses the seam, then soldering the seam to secure the ends of the blank and complete the seam, and forming the remainder of the bead or completing the bead in suitable die mechanism.

Numerous other objects and advantages of the invention will be apparent as it is better understood from the following description, which, taken in connection with the accompanying drawings, discloses a preferred embodiment thereof.

Referring to the drawings:

Fig. 1 is a perspective view of an interiorly beaded can embodying my invention and partly broken away to show details of construction;

Fig. 2 is a side elevational view of a can body blank positioned on the horn of the body maker and above the bumping hammer or at the bumping station, a portion of the can body and body maker horn being broken away to show details of construction;

Fig. 3 is a view similar to Fig. 2 showing the can body after the seam is complete and passing over a solder roll;

Figure 4:
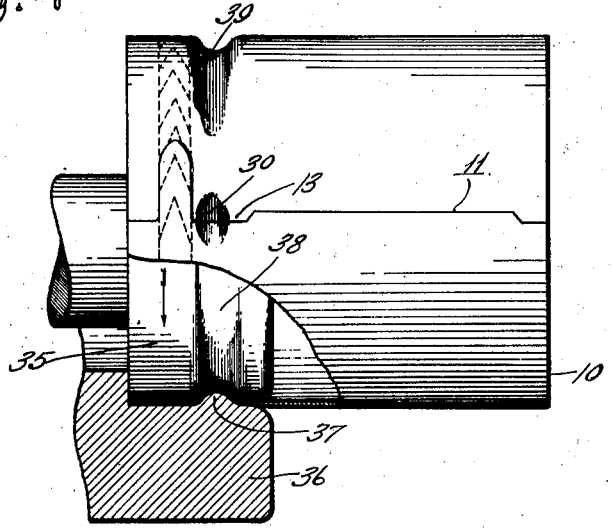
Fig. 4 is a partly broken away view of the can body positioned within a beading device and partly in section.

To illustrate my invention I have shown a hollow container body 10 of cylindrical or other form, provided with the usual lock and lap side seam, the lock part of the side seam being indicated by numeral 11, the lower lapped part by numeral 12 and the upper lapped part by numeral 13. Circumferentially parallel score lines 14 set off a tearing strip 15 which is further provided with auxiliary or directing score lines 16. The said tearing strip 15 terminates in the tongue 17 which extends beyond the lapped portion 13 of the said side seam. The container is provided with a bottom member 18 and a cover member 19 preferably double-seamed to the container body. The said cover member 19 is provided with a counter-sink 20 inwardly spaced from the interior wall of the container when the cover member is secured to the can body wall by the regular double seam 21. The can body wall just below the tearing strip is pressed inwardly at 22 to form an upwardly and inwardly extending loop or bead 23. The inner diameter of the loop portion 23 is correctly sized to securely engage the outer diameter of the counter-sink 20 after the tearing strip is removed and when the cover member 19 is used as a friction plug reclosure for the opened container 10.

Referring now to Fig. 2 which illustrates the gist of the invention, a partially shown bumping hammer 24 with bumping straight edge 25 and a beading ridge or projection 26 is illustrated as just having bumped the lock part 11 of the side seam which comprises four thicknesses of metal, and having depressed into an inward bead the lapped part 13 of the side seam which comprises two thicknesses of metal. The cam body 10 is brought to this bumping and pre-beading station upon a mandrel or horn 27 by feeding devices 28, and said mandrel or horn has a recess 29 corresponding in size and contour to the beading projection 26 of the hammer, the said recesses 29 and the said projection 26 co-operating to produce the pre-bead, indent or depression 30, also clearly illustrated in Fig. 4. From said prebeading and bumping station, the container body 10 is fed in the same direction by a chain conveyer 31 having feeding dogs 32 which engage the rear edge of the body cylinder and propel it between guide rails 33 or a so-called outside solder horse, over the solder bath where a solder roll 34 of a well known type and construction revolves in said solder bath and projects or throws molten solder into the open spaces of the can body side seam, and also between the lapped prebeaded or recessed part 30 of the side seam, the entire side seam having been previously fluxed and the flux acting to draw the solder by capillary attraction into the side seam parts including the depression 30, uniting said pre-beaded laps in a permanent solder joint, which, as has been found in the practice of my invention, will easily withstand, without breaking, the subsequent final beading and collapsing operation illustrated in Figs. 4 and 5.

Fig. 4 shows the can body 10 acted upon by an inner beading roller 35 and an outer ring die 36 with an inwardly extended annular bearing ridge or projection 37 which co-operates with the annular groove 38 of the beading roller 35 to produce the complete annular bead 39.

Figure 5:
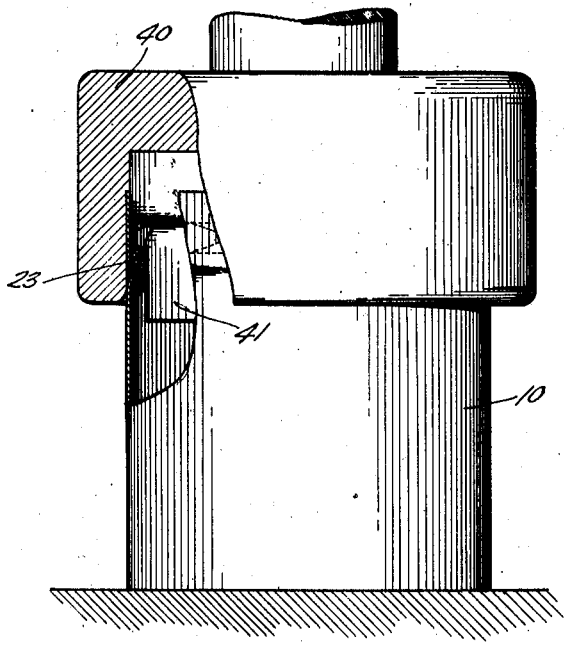
Fig. 5 shows the body after the beading operation and showing the wall of the can collapsed to form a portion of the bead.

After the annular bead 39 has been formed, the can body is subjected to a collapsing die 40 and a sizing die 41 which in co-operation bring the bead 39 to the finished looped form 23 shown in Fig. 5 and Fig. 1.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The method of making cans having interlocked or lapped side seams and encircling beads in the bodies thereof, which consists in forming the body, interlocking the side seam, bumping the side seam and at the same operation indenting the side seam, soldering the closed side seam and then forming an encircling bead in the body of the can that will intercept the said indentation and make it a part of said bead.

2. The method of making cans having side seams and encircling beads in the bodies thereof, which consists in forming the body and closing the side seam, making an indent in the side seam, hermetically sealing the side seam and then forming a bead in the body that will intercept the said indent and make it a part of said bead.

3. The method of progressively forming beads in can bodies, which consists in forming a cylindrical can body with a side seam, indenting the side seams, sealing the side seam, then forming the remainder of the bead using the indent as a part thereof.

4. The method of progressively forming beads in can bodies, which consists in forming a cylindrical can body with a side seam, forming a portion of an encircling bead across said side seam, sealing said side seam and then completing the formation of the encircling bead.

5. An apparatus for forming a cylindrical can body having a side seam, comprising, means for closing said seam and forming an indent therein, means for sealing said seam and means for then forming an encircling bead in said body located to intercept the indent previously made in said side seam whereby said indent forms a part of said bead.

6. In apparatus for making beaded containers, the combination of means for forming a side seamed container, means for bumping said side seam, means integral with said bumping means for prebending part of said side seam and means for completing said prebend into a peripheral bead.

7. The method of beading a container body having a side seam, which consists in forming a container body, prebending part of said container body which has more than one thickness of body material, soldering said prebent part and the completing said prebend into a peripheral bead.

8. The method of forming a peripheral looped wall portion in a container body which comprises forming a side seamed container body, prebending a part of said side seam, completing said prebend into a peripheral bead and then forming said bead into a peripheral looped wall portion of predetermined dimension.

9. A method of making interiorly beaded cans having soldered side seams, which consists in partly forming a portion of the bead in the seam forming operation, soldering the same and then forming the remainder of the bead.

10. A method of forming beaded lock seam cans, which consists in interrupting the lock seam and substituting a lap seam therefor throughout the area interrupted by the bead, forming the seam and partly forming a portion of the bead simultaneously, soldering the seam and then completing the formation of the bead.

11. An apparatus for forming beaded lock and lap seam cans, comprising, means for forming a can having a side seam a portion of which is a locked seam and another portion of which is a lap seam, means for bumping the lock seam and simultaneously forming an indent in the lap seam at a point to be interrupted by the bead, and means for forming the bead after the seam has been sealed by means of solder or the like.

GEORGE FREDRICK WALTER.